Feb. 15, 1944.     K. C. CLARK     2,341,528
VEHICLE COUPLER
Filed Jan. 26, 1942

INVENTOR.
KENNETH C. CLARK
BY Munn, Liddy, Slaccum + Kane
ATTORNEYS

Patented Feb. 15, 1944

2,341,528

UNITED STATES PATENT OFFICE 2,341,528

VEHICLE COUPLER

Kenneth C. Clark, Watsonville, Calif.

Application January 26, 1942, Serial No. 428,169

9 Claims. (Cl. 280—33.14)

The present invention relates to improvements in a vehicle coupler, and it consists of the combinations, constructions, and arrangements hereinafter described and claimed.

When an operator connects a truck or other powered vehicle to a trailer, it is necessary to swing the trailer tongue with the fifth wheel into a position where the tongue eye will register with the pintle carried by the truck. Where the trailer is of a large size, it is difficult to swing the tongue into the proper angular position and the difficulty is greatly increased when the trailer is loaded.

The principal object of my invention is to provide a vehicle coupler which will swing the tongue automatically into the correct position for aligning the tongue eye with the pintle as the two vehicles are brought into coupling position. This device obviates the necessity of the operator or truck driver swinging the tongue manually into the correct position to align the tongue eye with the pintle. It is done automatically by the mere moving of the two vehicles toward each other.

A further object of my invention is to provide a vehicle coupler which is extremely simple in construction and which may be readily attached to the truck without any changes being necessary in the latter. The device requires very little space and will not interfere with the normal operation of the pintle and tongue. Although I show and describe the device as aiding in the coupling of a truck and trailer, it can be used for coupling any two vehicles.

Other objects and advantages will appear in the following specification, and the novel features of the device will be particularly pointed out in the appended claims.

My invention is illustrated in the accompanying drawing forming a part of this application, in which.

While I have shown only the preferred form of my invention, it should be understood that various changes or modifications may be made within the scope of the appended claims without departing from the spirit of the invention.

In carrying out my invention I make use of two vehicles such as a truck A and a trailer B, which are to be coupled. The trailer B has a fifth wheel indicated generally at C and a tongue D connected to the fifth wheel. The tongue can swing about a horizontally disposed hinge 1, and a spring (not shown) is used for maintaining the tongue in a horizontal plane. The tongue and fifth wheel construction is standard and forms no part of my invention except insofar as it cooperates with the parts presently to be described.

The truck A carries a pintle E that is designed to enter an eye 2 of the tongue when the eye registers with the pintle. A keeper F cooperates with the pintle for holding the tongue on the pintle when once the pintle has been moved through the eye and the keeper swung down upon the pintle. A pin (not shown) may be passed through aligned openings 3 and 4 in the pintle and keeper. The pintle and keeper are of standard construction.

Figure 1:
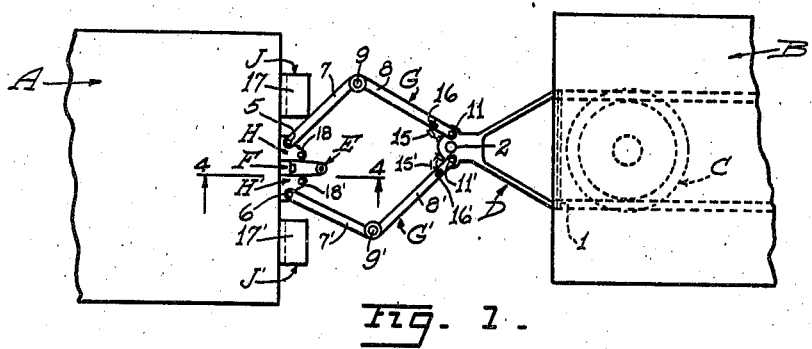
Figure 1 is a diagrammatic plan view of a portion of a truck and a portion of a trailer showing my device operatively connecting the two vehicles preparatory to coupling them.

My invention comprises two pairs of jointed arms G and G' which are pivoted at 5 and 6 to a casting H that in turn is secured to the tractor. Each jointed arm is identical in construction and therefore a description of one will suffice. Identical reference numerals will be given to similar parts in both pairs of arms except that the parts for the jointed arm G' will be primed. The jointed arm G has links 7 and 8 pivoted together at 9. The link 7 is long enough to reach from about the middle of the truck to the truck side, as shown in Figure 1. The link 7 when in collapsed position disposes its pivot 9 just inside the side of the vehicle A. The pivot 9 is preferably disposed within the side of the vehicle A when the link 7 is collapsed in order not to constitute an obstruction which projects beyond the vehicle side.

Figure 4:
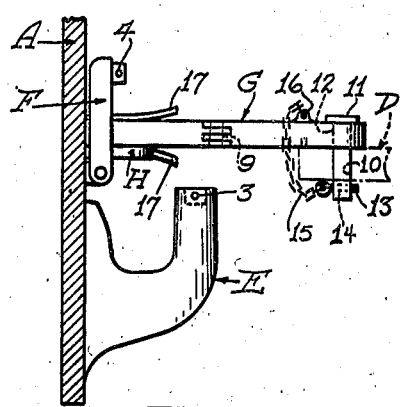
Figure 4 is a section on an enlarged scale taken substantially along the line 4—4 of Figure 1.

The link 8 is longer than the link 7 and when in folded position has its free end practically disposed at the center of the truck. The tongue D has openings 10, see Figure 4, arranged on each side of the eye 2, and designed to receive connecting pins 11 and 11' that are removably carried by the free ends of the links 8 and 8'. In Figure 4, I illustrate how the pin 11 extends through the opening 12 in the free end of the link 8 and then through the proper opening 10 in the tongue D. A cotter pin 13 may be passed through a transverse opening 14 in the connecting pin 11 for removably connecting the tongue to the jointed arm G. The cotter pin in turn has a chain 15 connecting it to a bracket 16 that is carried by the link 8. Both of the jointed arms G and G' are connected to the tongue by the connecting pins 11 and 11' in the manner described for the arm G.

It will be seen from this construction that as the two vehicles A and B are moved toward each other, as for example by the truck backing toward the trailer, the jointed arms G and G' will be collapsed with the links 7 and 7' first swinging against the rear of the truck followed by the links 8 and 8' swinging into substantially parallel arrangement with the links 7 and 7'. The length of the links 7—7' and 8—8' is such as to cause the jointed arms G and G' to swing the tongue if need be so that the eye 2 will be brought into registration with the pintle E. This registration is effected even though the tongue and the fifth wheel C must be swung angularly during the coupling movement as indicated in the drawing by comparing the position of the tongue in Figure 1 with its position in 2. The jointed arms are made strong enough to swing the tongue in a horizontal plane whether the trailer is empty or loaded in order to register the eye 2 with the pintle E. This registration is automatically effected because all the driver needs to do is to back the truck A toward the trailer B and the jointed arms G and G' will move the tongue eye into registration with the pintle.

I provide novel means for holding the jointed arms G and G' in inoperative position. This arm supporting means also causes the tongue D to be raised or lowered slightly with respect to the pintle if necessary so that the tongue will just clear the pintle top as it is moved into a position where the eye 2 will register with the pintle. The combined support and guide means for the jointed arms are indicated at J and J'. Each combined support and guide is in the shape of a channel with the channel groove extending in a horizontal position. The top and bottom sides 17 and 17' of the channels J and J' are flared away from each other, as shown in Figure 4, to receive the links 7—7' and also the links 8—8'. The guides J and J' are long enough to prevent any tendency for the links to fulcrum therein. If when the links 8 and 8' are initially received in the channels J and J', the tongue is too high or too low in its position with respect to the pintle top, the flared channel sides 17 and 17' will lower or raise the links the slight distance necessary to move the tongue to clear the pintle top.

Figure 2:
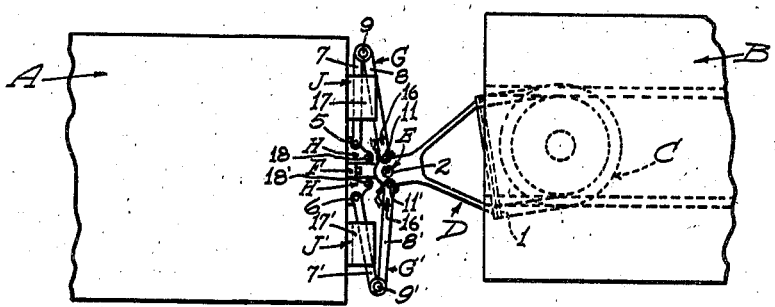
Figure 2 illustrates the same two vehicles of Figure 1 brought together in proper coupling arrangement by my device.
Figure 3:
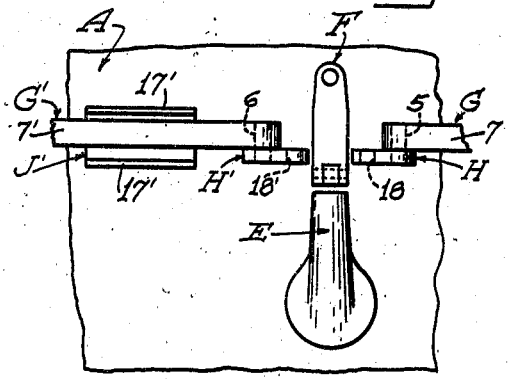
Figure 3 is a rear view of a portion of the truck and shows a part of the vehicle coupler on an enlarged scale.

I provide openings 18 and 18' in the castings H and H' for receiving the pins 11 and 11' after registration of the tongue eye with the pintle is made. Figure 2 illustrates the registration of the tongue with the pintle top, and when this is accomplished the driver may remove the pins 11 and 11' from the openings 10 and swing the links 8 and 8' so that their openings 12 will register with the openings 18 and 18', whereupon the pins 11 may be passed through the aligned openings and held in place by the cotter pins 13. The device is now locked in inoperative position and will not interfere with the normal functioning of the pintle and tongue. If desired, the free ends of the links 8 and 8' may be provided with perforated clevises that will receive the tongue portions adjacent to the pin openings 10 so that the tongue will be received between upper and lower parts of the clevis, and the perforations in each clevis will align with each opening 10. I do not show this arrangement in the drawing. If clevises are used at the ends of the links 8 and 8', they will receive the portions of the castings H and H' that have the openings 18 and 18' therein and will extend above and below the castings.

From the foregoing description of the various parts of the device, the operation thereof may be readily understood.

In normal practice without the use of my device, when connecting a truck or powered vehicle to a trailer or pulled vehicle, both vehicles being equipped with air brakes, the driver backs the truck close enough to the trailer to permit the air brake hose connections (not shown) of the truck and trailer to be coupled. The driver then enters his truck cab and applies the trailer air brakes to hold the trailer against accidental movement. After this is done the driver backs the truck toward the trailer and when he thinks the two vehicles are close enough together he applies the brakes of the truck. The driver then leaves the truck cab and goes to the back of the truck to swing the tongue so that it will register with the pintle. In case the driver has a helper, the helper performs the manual swinging of the tongue. Before the tongue will register with the pintle, it is frequently necessary for the driver to move his truck forward and backward a number of times before coupling is possible. With my device the manual swinging of the tongue is obviated since the jointed arms will perform this function. The registering of the tongue eye with the pintle by manually swinging the tongue is also obviated.

When using my device, the driver first backs the truck toward the trailer to a position where the air hose for the trailer brakes may be coupled to the air hose of the truck. The jointed arms G and G' are next connected to the tongue in the manner already described. The driver now reenters the truck cab and backs the truck until the tongue registers with the pintle. This registration is automatically accomplished because the jointed arms will swing the tongue and the fifth wheel angularly if necessary until the tongue eye registers with the pintle. During this movement the links enter the combined support and guides J and J' which will cause the jointed arms to raise or lower the tongue slightly if necessary. When the tongue end is moved above the pintle and the eye registers with the pintle, the driver applies the truck brakes and then goes to the back of the truck to free the links 8 and 8' from the tongue. This permits the links to be attached to the castings H and H' so as to be held in inoperative position. The driver moves the tongue down upon the pintle and swings the keeper F into engagement with the pintle for securing the vehicles in coupled relation. The support and guide, when holding the arms G and G' in inoperative position, prevent the jointed elbows from rattling as the truck moves over the ground. The device is ready for instant use at any time and does not interfere with the normal function of the tongue and pintle as coupling members.

I claim:

1. The combination with a vehicle having a pintle and a second vehicle having a pivoted tongue with an eye adapted to receive the pintle, of elbow-like arms pivotally carried by the first vehicle and attachable to the tongue for swinging the latter for guiding the eye into registry with the pintle when the two vehicles are brought into connectable relationship.

2. The combination with two vehicles having cooperating coupling means for connecting the two vehicles together, a part of the coupling means being carried by one vehicle and the remaining part being carried by the other vehicle, at least one part of the coupling means connected to one of the vehicles being swingable for connection to the coupling part carried by the other vehicle, of means carried by one of the vehicles and attachable to the swingable part of the coupling means carried by the other vehicle for moving the swingable coupling means part into a position to be connected to the coupling means part of the first vehicle as the two vehicles are moved toward each other for coupling purposes.

3. The combination with a vehicle having a pintle and a second vehicle having a fifth wheel with a tongue connected thereto, said tongue having an eye adapted to receive the pintle, of tongue-swinging means carried by the first vehicle and connectable to the tongue for swinging the tongue so that its eye will be brought into registration with the pintle when the two vehicles are moved toward each other for coupling purposes.

4. The combination with a vehicle having a pintle and a second vehicle having a fifth wheel with a tongue connected thereto, said tongue having an eye adapted to receive the pintle, of tongue-swinging means carried by the first vehicle and connectable to the tongue for swinging the tongue so that its eye will be brought into registration with the pintle when the two vehicles are moved toward each other for coupling purposes, and means cooperating with the tongue swinging means for positioning the tongue so that its eye will be above the pintle preparatory to connecting the tongue to the pintle.

5. The combination with a vehicle having a pintle and a second vehicle having a swingable tongue with an eye therein adapted to receive the pintle, of a pair of elbow-like arms pivoted to the first vehicle and having their free ends connectable to the tongue adjacent to the eye, the lengths of the arms being such as to guide the tongue eye into registration with the pintle when the two vehicles are moved toward each other for coupling purposes.

6. The combination with a vehicle having a pintle and a second vehicle having a swingable tongue with an eye therein adapted to receive the pintle, of a pair of elbow-like arms pivoted to the first vehicle and having their free ends connectable to the tongue adjacent to the eye, the lengths of the arms being such as to guide the tongue eye into registration with the pintle when the two vehicles are moved toward each other for coupling purposes, and guides for receiving the arms near the termination of their movement for positioning the tongue eye above the pintle when the tongue is ready to be connected thereto.

7. The combination with a vehicle having a pintle, a second vehicle having a pivoted tongue with an eye; of means carried by the first vehicle and connectable to the tongue for swinging the latter when the two vehicles are moved toward each other for moving the eye into registration with the pintle; said means comprising a pair of jointed arms pivoted to the first vehicle adjacent to the pintle; each jointed arm consisting of a link extending from the pivot and having a length slightly less than the distance from the pivot to the adjacent vehicle side, and a second link pivoted to the free end of the first link; means for removably securing the free ends of the second links of both jointed arms to the tongue; whereby a relative movement of the two vehicles toward each other will move the links of the jointed arms into a folded position, the arms causing the tongue eye to register with the pintle.

8. The combination with a vehicle having a pintle, a second vehicle having a pivoted tongue with an eye; of means carried by the first vehicle and connectable to the tongue for swinging the latter when the two vehicles are moved toward each other for moving the eye into registration with the pintle; said means comprising a pair of jointed arms pivoted to the first vehicle adjacent to the pintle; each jointed arm consisting of a link extending from the pivot and having a length slightly less than the distance from the pivot to the adjacent vehicle side, and a second link pivoted to the free end of the first link; means for removably securing the free ends of the second links of both jointed arms to the tongue; whereby a relative movement of the two vehicles toward each other will move the links of the jointed arms into a folded position, the arms causing the tongue eye to register with the pintle; link supporting members carried by the first vehicle and receiving the links of the arms when the links are moved into folded position, said members causing the links to raise or lower the free end of the tongue if need be in order to position it properly so that the tongue eye will register with the pintle.

9. The combination with a vehicle having a pintle, a second vehicle having a pivoted tongue with an eye; of means carried by the first vehicle and connectable to the tongue for swinging the latter when the two vehicles are moved toward each other for moving the eye into registration with the pintle; said means comprising a pair of jointed arms pivoted to the first vehicle adjacent to the pintle; each jointed arm consisting of a link extending from the pivot and having a length slightly less than the distance from the pivot to the adjacent vehicle side, and a second link pivoted to the free end of the first link; means for removably securing the free ends of the second links of both jointed arms to the tongue; whereby a relative movement of the two vehicles toward each other will move the links of the jointed arms into a folded position, the arms causing the tongue eye to register with the pintle; link supporting members carried by the first vehicle and receiving the links of the arms when the links are moved into folded position, said members causing the links to raise or lower the free end of the tongue if need be in order to position it properly so that the tongue eye will register with the pintle, said link securing means being removable from the tongue and securable to the first vehicle for holding the jointed arms in folded position.

KENNETH C. CLARK.